(12) United States Patent  
Ramachandran

(10) Patent No.: US 8,358,888 B2
(45) Date of Patent: Jan. 22, 2013

(54) SYSTEMS AND TECHNIQUES FOR GENERATING BESSEL BEAMS

(75) Inventor: Siddharth Ramachandran, Hoboken, NJ (US)

(73) Assignee: OFS Fitel, LLC, Norcross, GA (US)

( * ) Notice: Subject to any disclaimer, the term of this patent is extended or adjusted under 35 U.S.C. 154(b) by 76 days.

(21) Appl. No.: 12/398,676

(22) Filed: Mar. 5, 2009

(65) Prior Publication Data

US 2009/0257711 A1    Oct. 15, 2009

Related U.S. Application Data

(60) Provisional application No. 61/043,825, filed on Apr. 10, 2008.

(51) Int. Cl.
*G02B 6/32*    (2006.01)
(52) U.S. Cl. .................. 385/33; 372/9
(58) Field of Classification Search ........ 372/20, 372/9; 385/33
See application file for complete search history.

(56) References Cited

U.S. PATENT DOCUMENTS

| | | | | |
|---|---|---|---|---|
| 4,176,911 A * | 12/1979 | Marcatili et al. | ............ | 385/124 |
| 5,245,619 A * | 9/1993 | Kronberg | .......... | 372/32 |
| 5,394,411 A * | 2/1995 | Milchberg et al. | ............ | 372/5 |
| 5,524,018 A * | 6/1996 | Adachi | ............ | 372/98 |
| 5,703,978 A * | 12/1997 | DiGiovanni et al. | ......... | 385/37 |
| 5,963,359 A * | 10/1999 | Shinozaki et al. | ........... | 359/326 |
| 5,982,963 A * | 11/1999 | Feng et al. | ........... | 385/37 |
| 6,400,865 B1 * | 6/2002 | Strasser et al. | ........... | 385/28 |
| 6,427,041 B1 * | 7/2002 | Strasser et al. | ........... | 385/37 |
| 6,625,364 B2 * | 9/2003 | Johnson et al. | ........... | 385/127 |
| 6,657,771 B2 * | 12/2003 | Okayama | ............ | 359/290 |
| 6,728,038 B2 * | 4/2004 | Hulse | ............ | 359/590 |
| 6,728,289 B1 * | 4/2004 | Peake et al. | ........... | 372/101 |
| 6,795,481 B2 * | 9/2004 | Maleki et al. | .......... | 372/108 |
| 6,909,823 B1 * | 6/2005 | Sorin et al. | ........... | 385/28 |
| 7,110,651 B2 * | 9/2006 | Golowich et al. | ........... | 385/126 |
| 7,177,510 B2 * | 2/2007 | Ramachandran | ............ | 385/124 |
| 7,307,786 B2 * | 12/2007 | Hatjasalo et al. | ............ | 359/569 |
| 7,492,976 B2 * | 2/2009 | Mahgerefteh et al. | ............ | 385/4 |

(Continued)

OTHER PUBLICATIONS

Williams et al., "Generating Bessel beams by use of localized modes," Opt. Soc. Am. A, vol. 22, No. 5, May 2005, p. 992.*

(Continued)

*Primary Examiner* — Charlie Peng
*Assistant Examiner* — Peter Radkowski
(74) *Attorney, Agent, or Firm* — Jacobs & Kim LLP

(57) ABSTRACT

A technique is described for generating a Bessel beam. An input optical fiber is provided that supports propagation in the fundamental mode. The input fiber is connected to a fiber mode converting device that provides phase matching, at a predetermined excitation wavelength, between the fundamental mode and a selected azimuthally symmetric higher-order mode. As an input to the fiber mode converting device, a coherent light beam is fed through the input optical fiber to provide a fundamental mode input at the excitation wavelength. The fiber mode converting device resonantly excites the selected azimuthally symmetric mode. The azimuthally symmetric mode is provided as a beam output from an endface of the fiber mode converting device to approximate a Bessel beam.

11 Claims, 5 Drawing Sheets

U.S. PATENT DOCUMENTS

| | | | |
|---|---|---|---|
| 7,535,634 B1* | 5/2009 | Savchenkov et al. | 359/346 |
| 7,689,077 B1* | 3/2010 | DeCusatis | 385/37 |
| 2002/0018611 A1* | 2/2002 | Maleki et al. | 385/15 |
| 2002/0093723 A1* | 7/2002 | Okayama | 359/320 |
| 2002/0180951 A1* | 12/2002 | Benz et al. | 356/5.01 |
| 2003/0021306 A1* | 1/2003 | Fernald et al. | 372/20 |
| 2003/0039025 A1* | 2/2003 | Mugino et al. | 359/334 |
| 2003/0048537 A1* | 3/2003 | Hulse | 359/590 |
| 2003/0063426 A1* | 4/2003 | Smirnov et al. | 361/159 |
| 2003/0072523 A1* | 4/2003 | Lin et al. | 385/31 |
| 2004/0184815 A1* | 9/2004 | Korolev et al. | 398/148 |
| 2006/0091305 A1* | 5/2006 | Grunnet-Jepsen et al. | 250/231.18 |
| 2006/0110166 A1* | 5/2006 | Allen | 398/183 |
| 2008/0138013 A1* | 6/2008 | Parriaux | 385/37 |
| 2008/0219620 A1* | 9/2008 | Lindlein et al. | 385/28 |
| 2008/0232411 A1* | 9/2008 | Reid et al. | 372/20 |
| 2009/0027753 A1* | 1/2009 | Lizotte | 359/238 |
| 2009/0052482 A1* | 2/2009 | Vermeulen et al. | 372/34 |

OTHER PUBLICATIONS

Livesey, John Gregor, "ATOM Guiding in Free-Spacelight Beams and Photonic Crystal Fibres," Thesis submitted for the degree of Doctor of Philosophy, University of St. Andrews, Jan. 30, 2007.*

Lindlein et al., "Achieving Gaussian outputs from large-mode-area higher-order-mode fibers," Applied Optics, vol. 46, No. 22, Aug. 1, 2007, p. 5147-5157.*

Ilchenko et al., "Efficient generation of truncated Bessel beams using cylindrical waveguides," Optics Express, vol. 15, No. 9, Apr. 30, 2007, p. 5866.*

Vengsarkar, A.M., et al., "Long-Period Fiber Gratings as Band-Rejection Filters," Journal of Lightwave Technology, vol. 14, No. 1, pp. 58-65, Jan. 1996.

Ramachandran, S., et al., "Lifting Polarization Degeneracy of Modes by Fiber Design: a Platform for Polarization-Insensitive Microbend Fiber Gratings," Optics Letters, vol. 30, No. 21, pp. 2864-2866, Nov. 2005.

* cited by examiner

SYSTEMS AND TECHNIQUES FOR GENERATING BESSEL BEAMS

CROSS-REFERENCE TO RELATED APPLICATIONS

This application for patent claims the priority benefit of U.S. Provisional Patent Application Ser. No. 61/043,825, filed on Apr. 10, 2008, which is hereby incorporated by reference in its entirety.

BACKGROUND OF THE INVENTION

1. Field of the Invention

The present invention relates generally to optical fiber devices and methods, and in particular to improved systems and techniques for generating Bessel beams.

2. Description of Prior Art

The class of spatial patterns of light called Bessel beams have attracted recent interest because of their propagation invariant, i.e., diffraction-free, nature. Unlike Gaussian beams, the central spot in Bessel beams do not expand with propagation in free space. In addition, Bessel beams can self-heal, i.e., completely re-form past an opaque obstruction. Thus, Bessel beams can navigate around dark objects, and are of immense interest in a variety of fields of science and technology. Their uses range from enhanced optical tweezers, microscopy, and perhaps even free-space communications and Light Detection and Ranging (LIDAR).

Creating these beam profiles has proven to be difficult for a number of reasons. One current approach involves the use of axicons, which are a special class of free-space lenses. However, since axicons are bulk, free-space elements, they require careful alignment, and are not useful in systems requiring remote delivery. Thus, a fiber-device approach for producing Bessel beams would be highly preferable for applications requiring stability and remote delivery.

In one attempt at a fiber-based solution, an axicon was machined onto a fiber tip. However, this device was unsatisfactory. In addition to being prohibitively expensive from a manufacturing standpoint, the resulting 2 μm beam from this device diverged in less than 40 μm, primarily due to the fiber's inherently small aperture. Thus, the device did not offer significant advantages over Gaussian beams.

SUMMARY OF THE INVENTION

These and other issues of the prior art are addressed by the present invention, one aspect of which provides a technique for generating a Bessel beam. An input optical fiber is provided that supports propagation in the fundamental $LP_{01}$ mode. The input fiber is connected to a fiber mode converting device that provides phase matching, at a predetermined excitation wavelength, between the $LP_{01}$ mode and a selected azimuthally symmetric higher-order mode having N rings, where N is an integer with a value of at least 7. As an input to the fiber mode converting device, a coherent light beam is fed through the input optical fiber to provide an $LP_{01}$ mode input at the excitation wavelength. The fiber mode converting device resonantly excites the selected azimuthally symmetric higher-order mode. The higher-order mode then is provided as a beam output approximating a Bessel beam from an endface of the fiber mode converting device.

Additional features and advantages of the present invention will become apparent by reference to the following detailed description and accompanying drawings.

DETAILED DESCRIPTION

The above issues and others are addressed by the present invention, aspects of which are directed to a fiber-based technique for generating a beam that substantially approximates a Bessel beam.

In an embodiment of the present invention, a device based on an in-fiber grating that enables excitation of a very high-order spatial mode to closely approximate an ideal Bessel beam over a finite distance, is provided. The device includes a fiber mode converting device coupled to an endface output of an input optical fiber.

Figure 1:
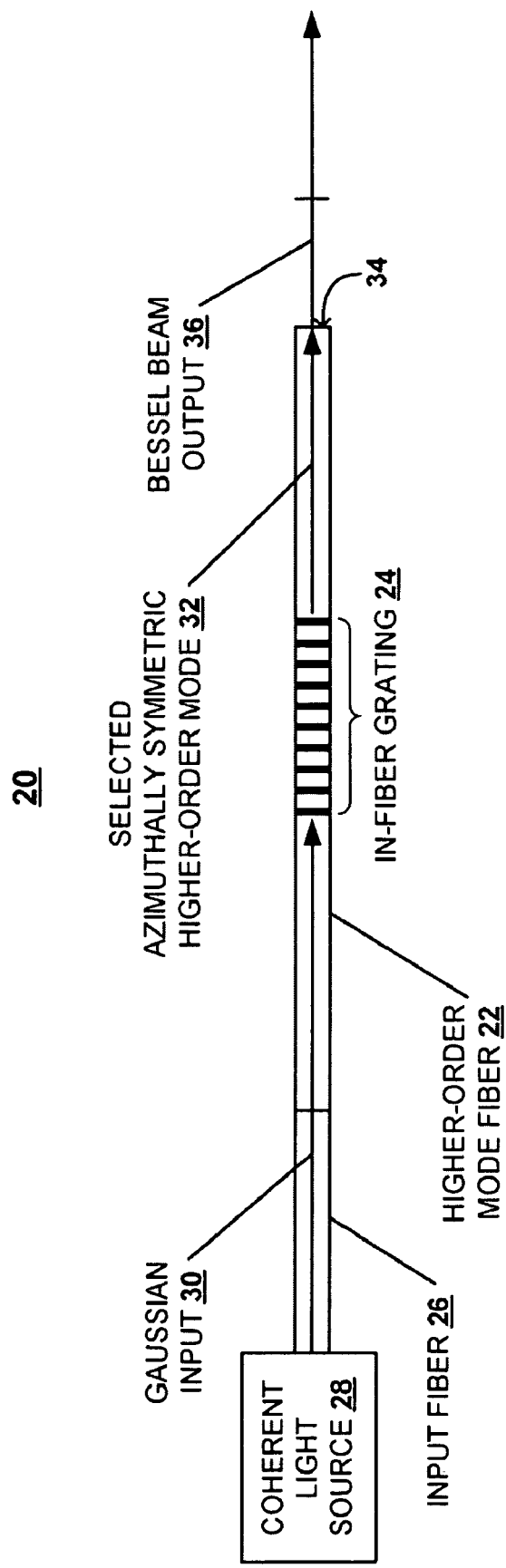
FIG. 1 is a diagram of a system according to an aspect of the invention for generating an approximation of a Bessel beam.

FIG. 1 is a diagram, of an exemplary system 20 according to an aspect of the invention. The system includes a high-order mode (HOM) fiber 22, such as an amplifier fiber or the like, having a grating 24 with a period that, in combination with other grating parameters, causes phase matching at an excitation wavelength between an $LP_{01}$ mode input and a selected azimuthally symmetric higher-order mode.

Together, HOM fiber 22 and grating 24 function as a fiber mode converting device. A first end of an input fiber 26 supporting an $LP_{01}$ mode is connected to a first end of HOM fiber 22. A second end of input fiber 26 is connected to a coherent light source 28, e.g., a laser. The light source 28 and input fiber 26 provide an $LP_{01}$ mode input 30 to HOM fiber 22 at the excitation wavelength. Grating 24 resonantly excites a selected azimuthally symmetric mode 32 of the $LP_{01}$ mode input. The selected azimuthally symmetric mode 32 has N rings, where N is an integer with a value of at least 7.

The second end of HOM fiber 22 terminates in an endface 34. The selected azimuthally symmetric HOM mode 32 exits fiber 22 at endface 34 and as approximates a Bessel beam output 36 in free space.

A detailed description of exemplary techniques that can be used to create grating 24 can be found in Vengsarkar, A. M., et al., "Long-Period Fiber Gratings as Band-Rejection Filters, "*Journal of Lightwave Technology*, vol. 14, pp. 58-65 (1996) ("Vengsarkar"), which is incorporated herein by reference in its entirety. Specifically, Vengsarkar describes a technique in which a long-period fiber grating is used to induce mode-coupling at a particular wavelength between the $LP_{01}$ mode and a particular individual higher-order cladding mode. In one described example, a long-period fiber grating is fabricated by exposing the core of a hydrogen-loaded germano-silicate fiber to ultraviolet light. A chrome-plated silica amplitude mask is used to create the desired periodicity in the grating. Vengsarkar further describes the relationship between higher-order mode coupling and grating parameters, including grating period.

An exemplary embodiment of the invention involves resonant excitation of the 12th order azimuthally symmetric mode, where N is 11. This embodiment yields a conversion efficiency of 99.8% from the conventional fundamental $LP_{01}$ mode to the selected azimuthally symmetric mode and an insertion loss of less than 0.1 dB.

As described in greater detail below, the Bessel-like properties of the device are confirmed by measuring a diffraction-resistant range of 450 μm for a beam having a central peak of 3.1 μm at full-width at half maximum (FWHM). In comparison, a Gaussian-shaped spot of similar size, 2.9 μm, from a highly nonlinear fiber (HNLF), is halved in peak intensity within only approximately 14 μm of propagation. Thus, the device described herein yields an improvement of approximately 32× over a standard Rayleigh range of a Gaussian-shaped light beam.

The lateral dimension of the described device is the fiber dimension, which in the presently described example is 125 μm. In contrast, the aperture of a free-space axicon with similar performance would have to be at least three times larger. The self-healing nature of the beams has been confirmed, as described in detail below. It has been found that an approximation of a Bessel beam generated in accordance with the techniques described herein recovered its shape within 2 cm of propagation past an opaque obstruction.

The presently described invention may be applied using an azimuthally symmetric mode other than the 12th-order mode. Generally speaking, a Bessel beam may be approximated through resonant excitation of an azimuthally symmetric mode having N rings, where N is an integer with a value of at least 7. The central parameter of interest is the evolution along the optical axis of the intensity profile of the central, high-intensity spot of a Bessel beam.

It should be noted that the presently described fiber device and techniques use a mode of a fiber in which the refractive index constant and mode size, and hence aperture size, can be controlled independently. Independent control of these parameters allows the diffraction-resistant range of Bessel beams to be designed without altering the device's physical dimensions, thereby providing another significant advantage over axicons. This control is achieved by changing the index contrast of the fiber waveguide that supports the desired azimuthally symmetric HOM, which controls confinement, or by changing the diameter of the fiber, which controls the aperture size.

Figure 2:
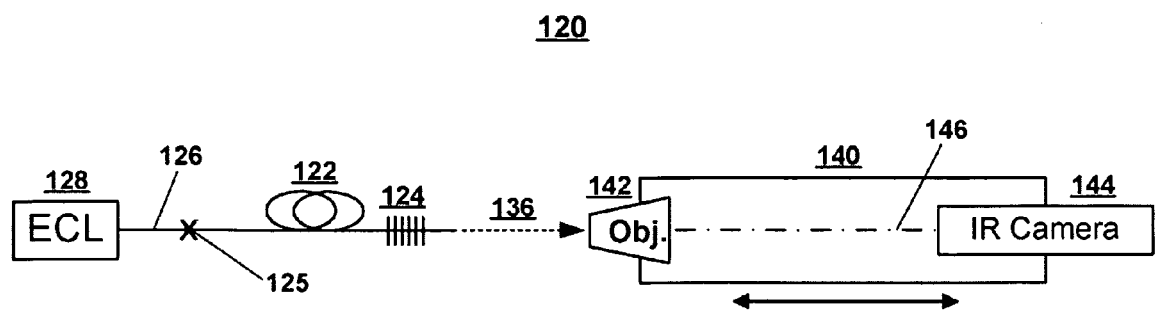
FIG. 2 is a diagram of an experimental setup for testing a Bessel beam generated in accordance with the present invention.

FIG. 2 shows an experimental setup 120 for generating a Bessel beam in according to the present invention. Setup 120 includes a length of higher-order mode (HOM) fiber 122 into which a suitable grating 124 has been written. A first end of input fiber 126 is connected to a first end of HOM fiber 122 at splice point 125. An external cavity laser 128 is used as a coherent light source and connects to HOM fiber 122.

Grating 124 resonantly excites a selected azimuthally symmetric mode of the Gaussian beam, in this example, the 12th order azimuthally symmetric mode, to approximate a Bessel beam 136 (DAN: this reference numeral should be added to the figure) exiting the endface of the HOM fiber 122. The Bessel beam 136 then is imaged using an imaging system 140 including microscope objective 142 and infrared camera 144. Imaging system 140 captures images of Bessel beam 136 at a series of distances along optical axis 146. For comparison, a Gaussian output from a highly non-linear fiber (HNLF) with a similar spot size, approximately 3 μm, was also measured.

Figures 3, 4:
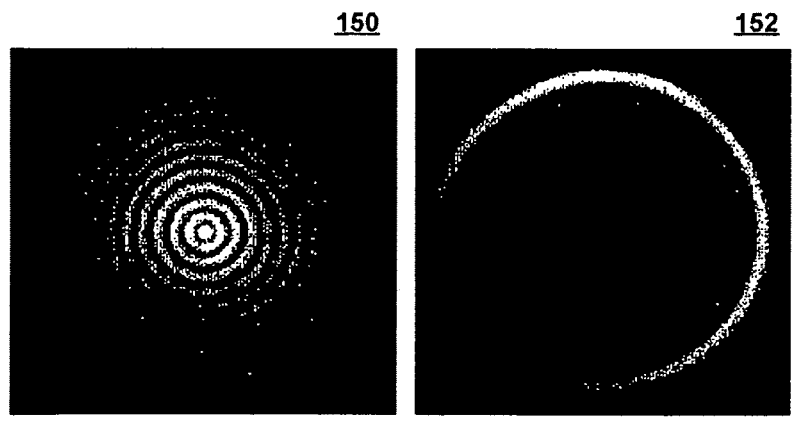
FIGS. 3 and 4 are images of a Bessel beam generated using experimental setup described in FIG. 2.

FIG. 3 is a near-field image 150 of an exemplary Bessel beam 136 generated from the experimental setup 120 described in FIG. 2. As shown in FIG. 3, the beam 136 is azimuthally symmetric and includes a central spot and 11 concentric rings.

FIG. 4 is an image of the ring-shaped far-field pattern 152 of the truncated Bessel beam 136. The far-field pattern 152 confirms that the beam 136 behaves like a Bessel beam. If the beam 136 had behaved like a higher-order Gaussian beam, the far-field image 148 would have resembled the near-field version 150 of FIG. 3, except with a larger spatial extent.

Figure 5:
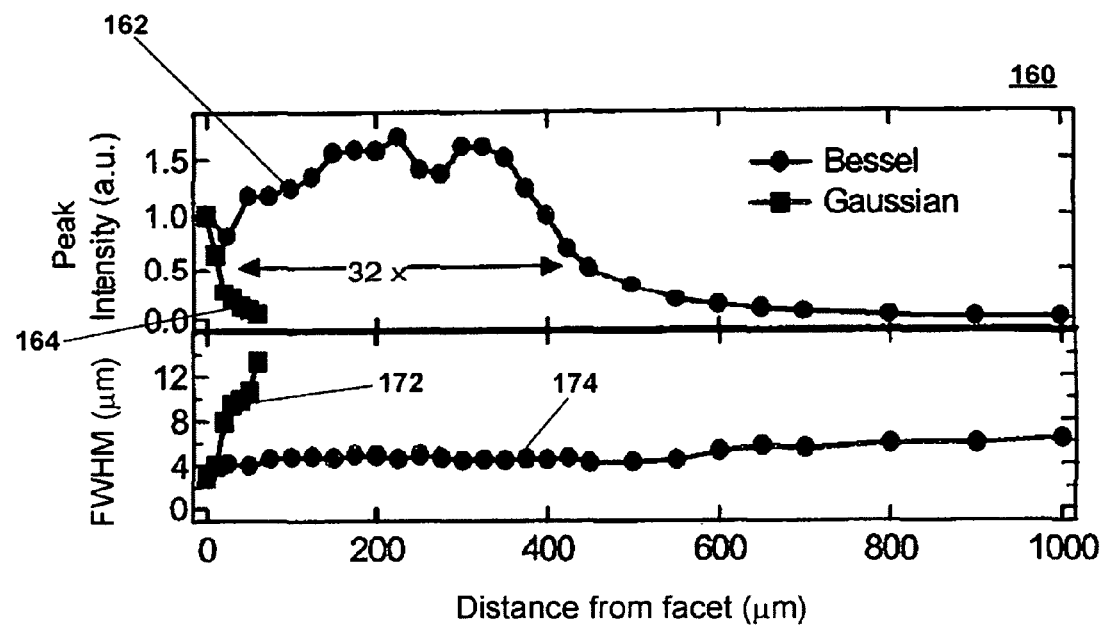
FIG. 5 is a graph setting forth a series of plots comparing the respective peak intensities and full-width at half-maximum (FHWM) of the central spots of a Bessel beam generated in accordance with the present invention and a reference Gaussian beam.
Figures 6A, 6B, 6C, 6D:
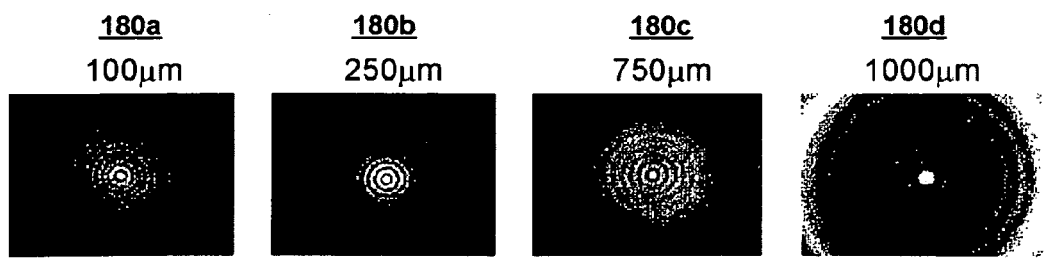
FIGS. 6A-D are a series of images of a Bessel beam generated using the experimental setup shown in FIG. 4 recorded by an infrared camera at a series of distances along the optical axis.

FIG. 5 shows a graph 160 setting forth the results from the FIG. 2 experimental setup 120, at distances ranging from 0 to 1000 μm from the device endface. FIGS. 6A-D show a series of infrared camera images 180a-d from setup 120, taken respectively at 100 μm, 250 μm, 750 μm, and 1000 μm.

In FIG. 5, upper plots 162 and 164 compare the respective peak intensities of the central spot, measured in arbitrary units, of the Bessel and Gaussian outputs, and lower plots 172 and 174 compare the respective full-width at half-maximum (FHWM) values of the central spot, measured in micrometers, of the Bessel and Gaussian outputs.

As shown in FIG. 5, there is a significant difference in peak intensity vs. propagation distance in plots 162 and 164: 450 μm for the Bessel beam, as opposed to 14 μm for the Gaussian output. Plots 162 and 164 demonstrate an approximately 32× increase in the rate over which the Bessel beam has peak intensity greater than one-half its original value. Also noteworthy is the relatively sharp cutoff in peak intensity of the Bessel beam in plot 162. This cutoff may be used to tailor imaging devices with specific depth-of-foci, independent of spot size, for example, biological endoscopes and laser and cutting machinery. Hence, the systems of the present invention may open up previously inaccessible application spaces for applications of Bessel beams, for instance in endoscopic cell manipulation in biomedical systems, or in free-space propagation from high-power fiber lasers.

It should be noted that the spot size of the Bessel beam hardly changes over a range as large as 1000 μm, even though the FWHM of the Gaussian beam expectedly diverges, as shown in plots 174 and 172, respectively. However, generally speaking, the useful range of the beam is defined by plot 162, showing the intensity of the central spot.

Figure 7:
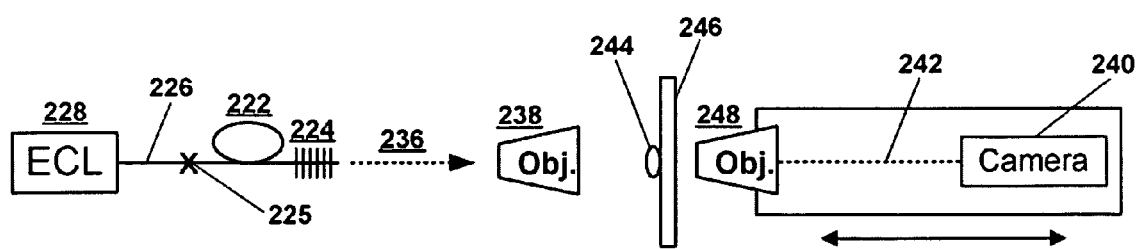
FIG. 7 is a diagram of an experimental setup for testing the self-healing properties of a Bessel beam generated in accordance with the present invention.
Figures 8A, 8B, 8C, 8D, 8E:
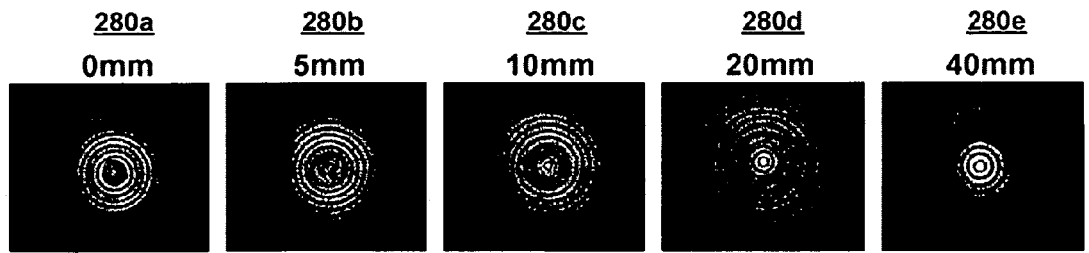
FIGS. 8A-E are a series of images of a Bessel beam generated using the experimental setup shown in FIG. 7 recorded by an infrared camera at a series of distances along the optical axis.

FIG. 7 shows another experimental setup 220 for testing the self-healing characteristic of a Bessel beam generated according to the presently described techniques. Setup 220 includes a length of a higher-order mode (HOM) fiber 222 into which a suitable grating 224 has been written. A first end of input fiber 226 is connected to a first end of HOM fiber 222 at splice point 225. An external cavity laser 228 is used in conjunction with input fiber 226 to provide a fundamental $LP_{01}$ mode input at the excitation wavelength, which is fed through input fiber 226 into HOM fiber 222.

Grating 224 resonantly excites a selected azimuthally symmetric higher-order mode of the $LP_{01}$ mode input beam, such as the 12th order mode, which approximates a Bessel beam output 236 exiting the endface of the HOM fiber 222. In setup 220, microscope objective 238 is used to telescope the beam 236 to obtain a central spot size of approximately 50 μm so that an opaque spot 244 having a dimension of approximately 250 µm may be introduced into the beam path on a glass slide 246. A second microscope objective 240 is used to image the beam after it has traveled around opaque spot 244 at a series of positions along the optical axis 242.

FIGS. 8A-8E show a series of camera images 280a-280e from different slices along the optical axis, taken respectively at 0 mm, 5 mm, 10 mm, 20 mm, and 40 mm. The contrast and gamma-ratios for the images are the same throughout this series so as to realistically gauge the degree to which the beam recovers its shape. It has been found that within 20 mm past the obstruction 244, the beam recovers its original shape with respect to the high-intensity central spot; the observed recovery improves with further propagation along the optical axis 242. In this case, due to the expanded beam size, the diffraction-resistant range is greater than 50 cm. Note that the opaque spot 244 was actually five times the size of the central spot. This size for the opaque spot 244 was expected to provide a good approximation of an ideal Bessel beam, because the outer rings of the beam serve to "feed" the center to recreate the original shape.

Figure 9:
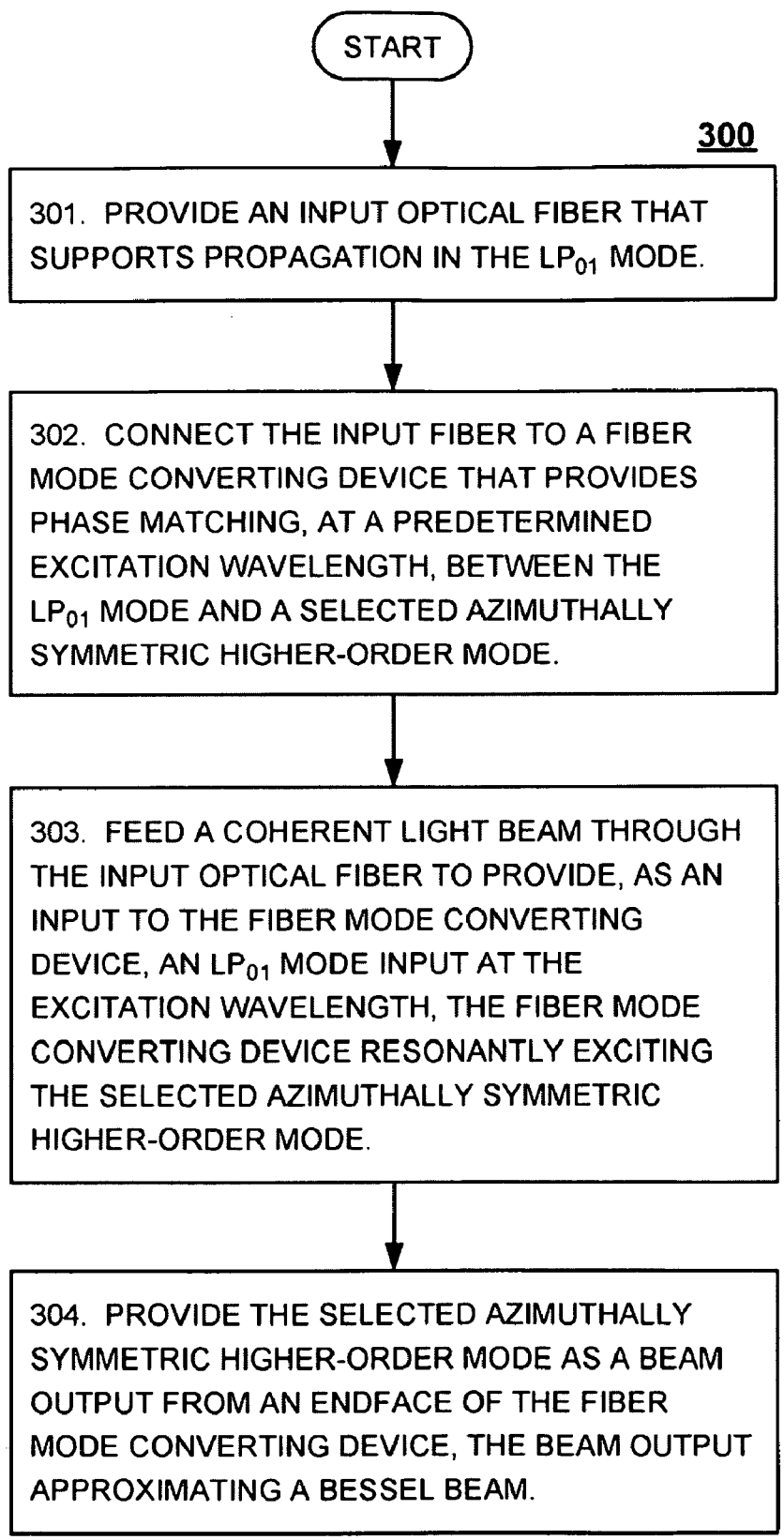
FIG. 9 is a flowchart of an overall technique for generating a Bessel beam in accordance with various described aspects of the invention.

FIG. 9 shows a flowchart of an overall technique 300 for generating a Bessel beam according to an embodiment of the invention. The method 300 includes the following steps:

301: Provide an input optical fiber that supports propagation in the fundamental $LP_{01}$ mode.

302: Connect the input fiber to a fiber mode converting device that provides phase matching, at a predetermined excitation wavelength, between the $LP_{01}$ mode input and a selected azimuthally symmetric HOM.

303: Feed a coherent light beam through the input optical fiber to provide, as an input to the fiber mode converting device, an $LP_{01}$ mode input at the excitation wavelength, the fiber mode converting device resonantly exciting the selected azimuthally symmetric HOM.

304: Provide an azimuthally symmetric HOM as a beam output from an endface of the fiber mode converting device, the beam output approximating a Bessel beam.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for generating an approximate Bessel beam, comprising the steps:
    (a) providing an input optical fiber that supports propagation in a fundamental $LP_{01}$ mode;
    (b) connecting the input fiber to a high-order mode fiber, wherein the high order-mode fiber includes an in-fiber mode converting device that provides phase matching, at a predetermined excitation wavelength, between the $LP_{01}$ mode input and a single selected azimuthally symmetric higher-order waveguide mode of the high-order mode fiber, wherein the azimuthally symmetric higher-order waveguide mode comprises N rings, N being an integer of at least 7;
    (c) feeding a coherent light beam through the input optical fiber to provide, as an input to the in-fiber mode converting device, an $LP_{01}$ mode input at the excitation wavelength, the in-fiber mode converting device resonantly exciting the selected azimuthally symmetric higher-order waveguide mode; and
    (d) providing the azimuthally symmetric higher-order waveguide mode as a beam output from an endface of the high-order mode fiber, wherein the beam output approximates a Bessel beam,
    such that the beam output has an aperture controlled by the waveguide mode size; and
    such that the beam output has a diffraction-resistant range that is controlled independently by the waveguide mode size and the high-order mode fiber index contrast.

2. The method of claim 1, wherein the coherent light beam is provided by a laser.

3. The method of claim 1, wherein the mode converting device is a grating written into the high-order mode fiber.

4. The method of claim 3, wherein a characteristic of the grating is a period having a range of approximately 50 microns to approximately 1000 microns.

5. The method of claim 1, further comprising the step (original):
    (d) designing a diffraction-resistant range of the approximated Bessel beam by adjusting at least one of an index contrast and a diameter of the high-order mode fiber.

6. The method of claim 1, wherein the fiber grating is fabricated from a rare-earth doped fiber.

7. A system for generating an approximate Bessel beam, comprising:
    a high-order mode fiber including an in-fiber grating, the high-order mode fiber and grating providing phase matching, at an excitation wavelength, between an $LP_{01}$ mode and a single selected azimuthally symmetric higher-order waveguide mode of the high-order mode fiber comprising N rings, N being an integer of at least 7, such that the selected higher-order waveguide mode approximates a Bessel beam;
    an input fiber connected to a lead end of the high-order mode fiber, the input fiber supporting propagation in the $LP_{01}$ mode;
    a coherent light source connected to the input fiber, the coherent light source and input fiber providing an $LP_{01}$ mode input, at the excitation wavelength, to the high-order mode fiber such that the selected azimuthally symmetric higher-order waveguide mode is resonantly excited,
    wherein the selected azimuthally symmetric higher-order waveguide mode is provided as a beam output at an endface of the high-order mode fiber,
    such that the beam output has an aperture controlled by the waveguide mode size; and
    such that the beam output has a diffraction-resistant range that is controlled independently by the waveguide mode size and the high-order mode fiber index contrast.

8. The system of claim 7, wherein the coherent light source is a laser.

9. The system of claim 7, wherein a characteristic of the grating is a period having a range of approximately 50 microns to approximately 1000 microns.

10. The system of claim 7, wherein a diffraction-resistant range of the approximated Bessel beam is adjustable by adjusting at least one of an index contrast and a size of the waveguide mode.

11. The system of claim 7, wherein the fiber grating is fabricated from a rare-earth doped fiber.

* * * * *